United States Patent
Westfield et al.

(10) Patent No.: US 6,813,318 B1
(45) Date of Patent: Nov. 2, 2004

(54) PROCESS TRANSMITTER HAVING A STEP-UP CONVERTER FOR POWERING ANALOG COMPONENTS

(75) Inventors: Brian L. Westfield, Victoria, MN (US); Weston T. Roper, Chanhassen, MN (US); David G. Tyson, Eden Prairie, MN (US)

(73) Assignee: Rosemount Inc,, Eden Prairie, MN (US)

( * ) Notice: Subject to any disclaimer, the term of this patent is extended or adjusted under 35 U.S.C. 154(b) by 0 days.

(21) Appl. No.: 09/303,050

(22) Filed: Apr. 30, 1999

(51) Int. Cl.[7] .............................................. H04L 27/20
(52) U.S. Cl. ................... 375/295; 340/870.21
(58) Field of Search ................ 375/354, 295; 340/870.18, 870.37, 870.21

(56) References Cited

U.S. PATENT DOCUMENTS

| | | | |
|---|---|---|---|
| 4,015,609 A | 4/1977 | Mensink et al. ...... 128/419 PG |
| 4,413,224 A | 11/1983 | Krupka et al. .............. 323/222 |
| 4,606,076 A | 8/1986 | Davis .......................... 455/343 |
| 4,970,451 A | 11/1990 | Suomalainen ............... 323/222 |
| 5,184,094 A | * 2/1993 | Kohler ....................... 331/158 |
| 5,187,474 A | 2/1993 | Kielb et al. ............ 340/870.18 |
| 5,360,997 A | * 11/1994 | Watson ....................... 323/268 |
| 5,377,090 A | 12/1994 | Steigerwald ................. 363/20 |
| 5,535,243 A | 7/1996 | Voegele et al. ............. 375/259 |
| 5,541,860 A | * 7/1996 | Takei et al. ................. 702/141 |
| 5,610,552 A | 3/1997 | Schlesinger et al. ........ 327/560 |
| 5,659,206 A | 8/1997 | Taguchi et al. ............... 307/11 |
| 5,710,552 A | * 1/1998 | McCoy et al. ......... 340/870.21 |
| 5,764,891 A | 6/1998 | Warrior ................... 395/200.2 |
| 5,973,942 A | 10/1999 | Nelson et al. ................ 363/21 |

FOREIGN PATENT DOCUMENTS

EP 0 529 391 A1 6/1998

OTHER PUBLICATIONS

MAXIM Data sheet for MAX 631/632/633 CMOS Fixed/Adjustable Output Step–Up Switching Regulators (03/90).

* cited by examiner

Primary Examiner—Stephen Chin
Assistant Examiner—Kevin Kim
(74) Attorney, Agent, or Firm—Westman, Champlin & Kelly, P.A.

(57) ABSTRACT

A process transmitter suitable for coupling to a process loop. The process transmitter includes a power regulator adapted to receive a power signal on the process loop and to provide a first signal having a first voltage. Digital components of the process transmitter are electrically coupled to the power regulator to receive power from the first signal. A step-up converter is electrically coupled to the power regulator and receives the first signal. The step-up converter outputs a second signal having a second voltage larger than the first voltage. Analog components of the process transmitter are electrically coupled to the step-up converter to receive power from the second signal.

7 Claims, 10 Drawing Sheets

PROCESS TRANSMITTER HAVING A STEP-UP CONVERTER FOR POWERING ANALOG COMPONENTS

BACKGROUND OF THE INVENTION

The process measurement industry employs process transmitters to remotely monitor process variables associated with substances such as solids, slurries, liquids, vapors, and gasses in chemical, pulp, petroleum, pharmaceutical, food and other processing plants. Process variables include pressure, temperature, flow, level, turbidity, density, concentration, chemical composition and other properties. A process transmitter is a transducer that responds to a process variable and converts the variable to a standardized electrical signal.

A process transmitter communicates the standardized electrical signal over a process loop to a control room, such that the process can be monitored and controlled. One type of process loop is a two-wire, 4–20 mA process control loop. Two-wire process transmitters operate on such low energy levels that they receive all electrical power from the 4–20 mA loop.

Process transmitters have evolved from devices having only analog components, to integrated smart transmitters having analog and digital components. Each new generation of process transmitters is expected to provide higher performance and more functionality than the previous generation. As performance requirements of process transmitters increase, the basic power requirements of the transmitters remains unchanged. For example, for new generations of 4–20 mA process transmitters, a common requirement that the electronics draw less than 3 mA typically still applies.

To provide increased functionality, some process transmitters are being designed with low voltage component technologies that reduce current consumption by the electronics. The supply or rail voltages used by a component are the direct current (D.C.) voltages provided for powering the component. With the current saved by reducing the supply voltage, performance and functionality can be increased without exceeding 3 mA of total current consumption.

Generally, digital components require lower supply voltages than analog components. However, analog components are needed to provide high resolution information on the sensed variable. Analog components do not operate well at low voltages. Also, a reduction in the supply voltage limits the input voltage range for analog-to-digital converters which are frequently included in process transmitters. Limiting the input voltage range of an analog-to-digital converter limits the resolution of the analog-to-digital converter. The combined effect of the decrease in signal to noise ratio and the limited analog-to-digital converter input voltage range can result in a significant loss of overall performance. Further, each time new lower supply voltage generations of digital components are implemented in a process transmitter, the analog sensor electronics must typically be redesigned.

SUMMARY OF THE INVENTION

A step-up converter for powering analog components in a process transmitter permits powering both low voltage digital components and higher voltage analog components. A step-up converter is a switching regulator which receives an input voltage signal and outputs a signal having a higher voltage. The process transmitter includes a power regulator which provides the input voltage signal to the step-up converter. The step-up converter receives the input voltage signal and outputs the higher voltage signal. Analog components electrically coupled to the step-up converter receive power from the higher voltage signal, while digital components electrically coupled to the power regulator receive power from the input voltage signal.

The step-up converter included in the process transmitter allows low voltage digital components to be utilized, while also allowing analog components to operate at higher voltages. Operating the analog components at higher voltages improves the resolution and other performance characteristics of the transmitter. Also, inclusion of the step-up converter allows new lower voltage digital components to be used in the future, without redesigning the analog components.

In one aspect, a start-up circuit is included in the process transmitter that prevents the step-up converter from providing the higher voltage signal until the input voltage signal has surpassed a first threshold voltage. The start-up circuit prevents the step-up converter from drawing excessive amounts of current during initialization or power-up of the transmitter.

In another aspect, the start-up circuit controls a switch to selectively connect the step-up converter to analog components. The start-up circuit controls the switch such that the signal having the higher voltage is used to power the analog components only after the voltage of the input voltage signal has surpassed a second threshold voltage. The second threshold voltage is higher in magnitude than the first threshold voltage. The start-up circuit prevents the step-up converter from being connected to a load prior to the input voltage signal surpassing the second threshold in order to increase the power efficiency of the step-up converter.

Still other aspects include a start-up circuit or circuits that both prevent the start-up circuit from providing the higher voltage signal until after the input voltage signal has surpassed the first threshold, and control the switch to connect the higher voltage signal to the analog components only after the input voltage signal has surpassed the second threshold.

DETAILED DESCRIPTION OF THE PREFERRED EMBODIMENTS

The process transmitters of the invention are described in the following detailed description, and are referenced in the accompanying drawings. The following description and accompanying drawings illustrate preferred embodiments of the invention. However, workers skilled in the art will recognize that changes may be made in form and detail to obtain other embodiments without departing from the spirit and scope of the invention as defined by the appended claims. The description, drawings and claims should be interpreted to cover all such alternate embodiments.

Figure 1:
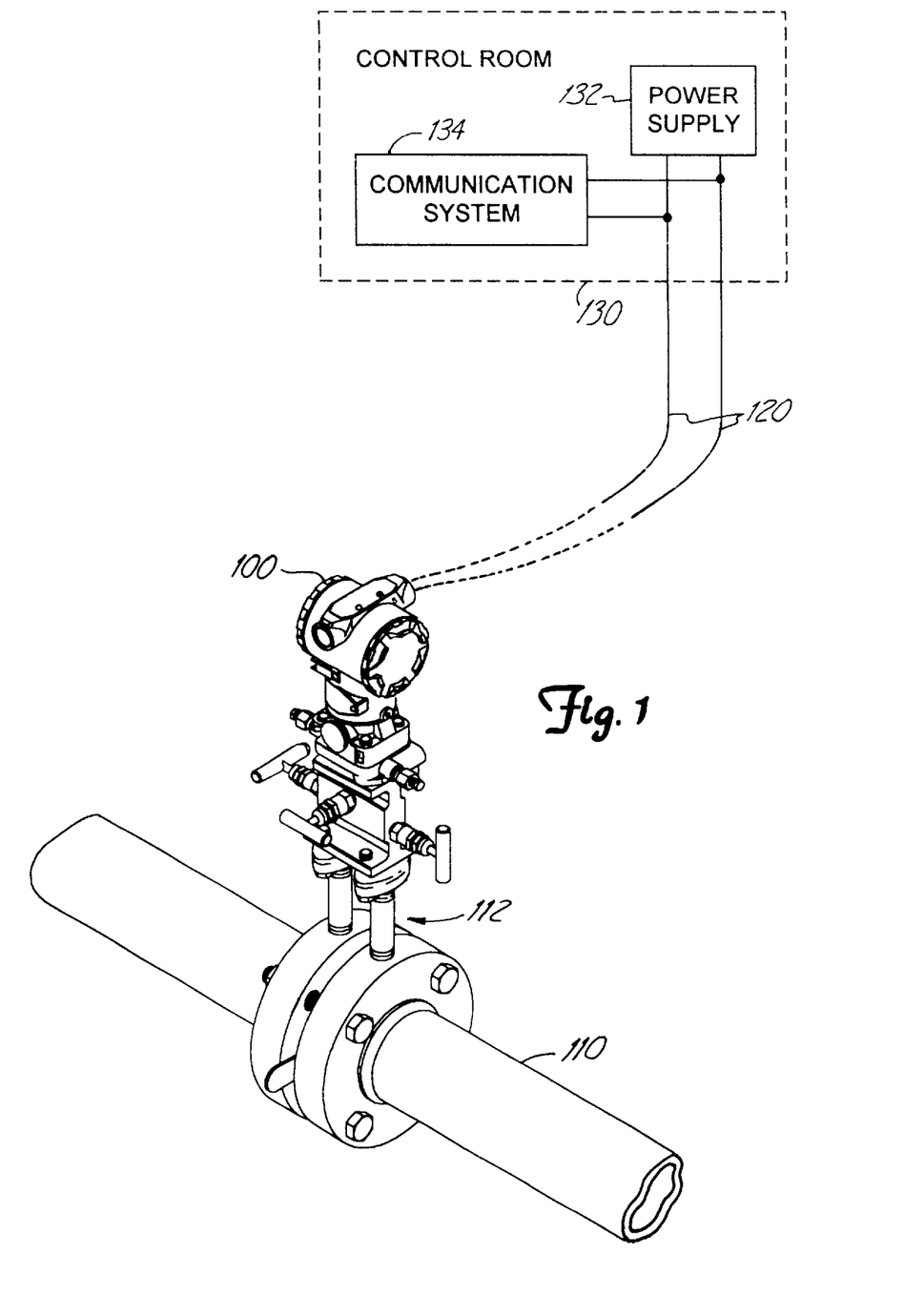
FIG. 1 is a diagram of a process control system illustrating the environment of embodiments of the invention.

FIG. 1 is a diagram illustrating process transmitter 100 operating in the environment of being mounted to a process fluid container such as pipe 110. Transmitter 100 receives or is coupled to process fluid directly through impulse piping 112 or similar connections to the process fluid container. From the process fluid, transmitter 100 determines a parameter related to the process fluid and relates a signal to the process parameter. Transmitter 100 is coupled to process loop 120, and transmits the signal and/or other information related to the process fluid over loop 120 to control room 130 or to other devices (not shown) coupled to process loop 120. Control room 130 includes a power supply 132 and a communications system 134.

Transmitter 100 can be a two-wire, a three-wire, a four-wire or other type of transmitter. A standard output for two-wire transmitters is 4–20 mA D.C. or 10–50 mA D.C. Four-wire transmitters can also provide zero-based voltage signals. The most common being 0–5 V D.C. Three-wire transmitters can also provide a 4–20 mA D.C., 10–50 mA D.C., or a zero-based signal.

Two-wire transmitters include only two wires connected to the transmitter, which are used for both powering the transmitter and for communicating with the transmitter. Two-wire transmitters require an external D.C. voltage power supply, such as power supply 132 in control room 130. Three-wire transmitters also require an external D.C. voltage power supply, with one lead as common for both signal (communications) and power. Four-wire transmitters have two wires for communications and two wires for power. A typical power requirement of a four-wire transmitter is 115 V A.C., with the transmitter including a built-in transformer, rectifier, and regulator.

Process loop 120 provides a power signal from power supply 132 to process transmitter 100. A process loop is a process control configuration where two or more conductors provide communication for devices on the loop. As such, process loop 120 may be a process loop in accordance with such process communication protocols as the low-speed Fieldbus protocol (H1), the high-speed Fieldbus protocol (H2), the HART® protocol, or other suitable protocols which provide transmission of digital information on a process loop.

Figure 2:
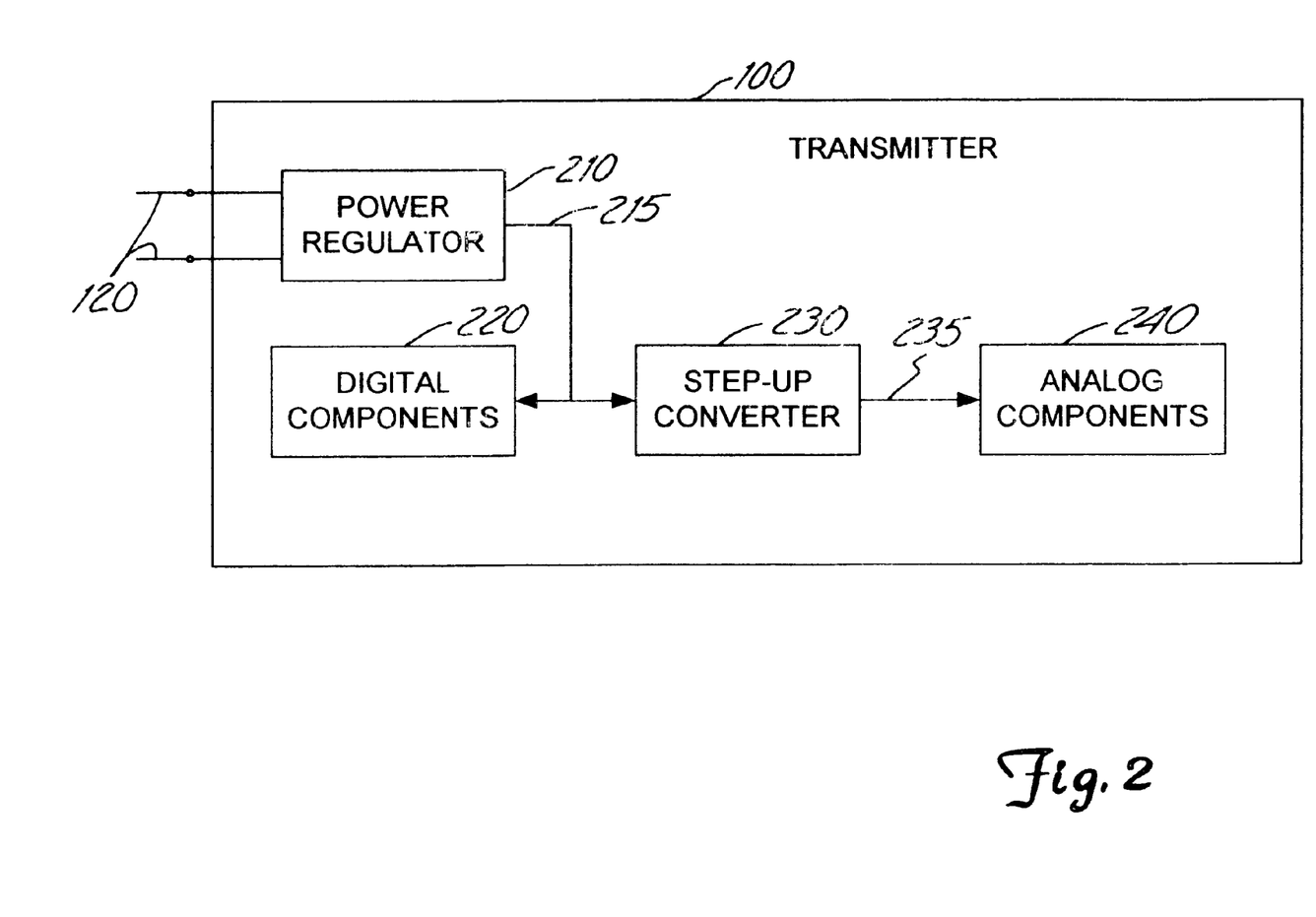
FIG. 2 is a block diagram illustrating circuitry of a process transmitter in accordance with an embodiment of the invention.
Figure 3:
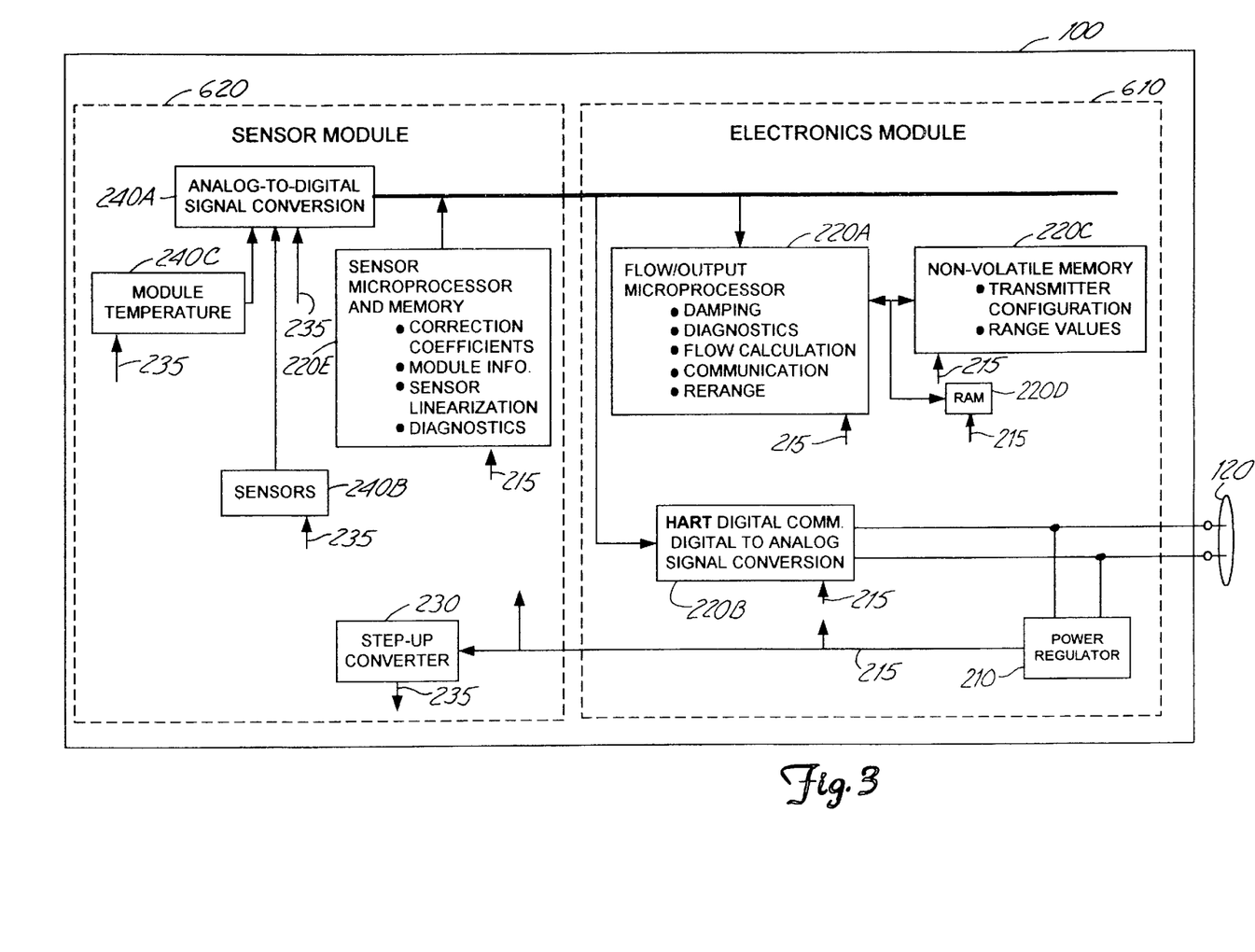
FIG. 3 is a block diagram illustrating in greater detail circuitry of the process transmitter of FIG. 2.

FIGS. 2 and 3 are block diagrams illustrating process transmitter 100 in varying detail. Process transmitter 100 includes power regulator 210, digital components 220, step-up converter 230 and analog components 240. As illustrated in FIG. 3, transmitter 100 can include electronics module 610 and sensor module 620 electrically coupled to each other. Power regulator 210 included in electronics module 610 can be any device, devices or circuit adapted to receive a power signal and to provide in response a signal 215 having a first voltage. For instance, power regulator 210 can be a step-up or a step-down voltage converter such as a linear regulator or other types of switching power regulators. In two-wire embodiments, power regulator 210 receives the power signal from process loop 120, and generates first signal 215 based upon the received power signal. Power regulator 210 can supply signal 215 at the first voltage if the power input to the power regulator is above a minimum voltage typically referred to as a lift-off voltage. A typical lift-off voltage for a process transmitter is, for example, 11 volts.

In receiving the power signal from process loop 120, power regulator 210 can be electrically coupled directly to the process loop, or can be electrically coupled to the process loop through communication circuitry or other circuitry. The term electrically coupled refers to both direct electrical connection and electrical connection through other components. The first voltage of signal 215 can be a first direct current (D.C.) supply or rail voltage. A supply or rail voltage is a maximum magnitude positive or negative D.C. voltage which is required by various integrated chip devices for operation. In one embodiment, the voltage magnitude of signal 215 is approximately 3.5 volts or less. The voltage of signal 215 is the supply voltage required by the particular digital components 220 used in process transmitter 100.

Digital components 220 are electrically coupled to power regulator 210 to receive power from signal 215. Digital components 220 are integrated chips or other devices adapted to receive supply voltages and digital (bi-state) logic inputs, and adapted to generate digital logic outputs. Digital components 220 can include for example microprocessors 220A, digital signal processors (not shown), modems and other communication circuitry 220B, non-volatile and random access memory devices 220C and 220D, and other digital circuitry within electronics module 610. Digital components 220 can also include one or more microprocessors 220E or other digital circuitry within sensor module 620.

Step-up converter 230 is any of a wide variety of switching regulators capable of generating an output voltage which has a larger magnitude than its input or supply voltages. Step-up converter 230 is electrically coupled to power regulator 210 and receives as an input signal 215, and outputs signal 235 having a second voltage. The second voltage is larger in magnitude than the first voltage. The voltage of signal 235 can be a second D.C. supply voltage, for example 5 volts. As illustrated in FIG. 3, if transmitter 100 includes separate sensor and electronics modules, then step-up converter 230 is preferably located within sensor module 620. Inclusion of step-up converter 230 in sensor module 620 reduces the number of electrical connections necessary between modules 160 and 620. However, in other embodiments converter 230 can be located within electronics module 610.

Step-up converter 230 can be, for example, an integrated circuit step-up converter manufactured and sold by MAXUM under the part number MAX756ESA. Any of a number of other commercially available step-up converters can be used. Frequently, the step-up converters are capable of providing signal 235 at the second voltage using a range of input voltages. This allows the voltage of signal 215 to be changed if necessary to accommodate new lower voltage digital components, without the need to completely redesign the analog components of process transmitter 100. For example, in some embodiments, step-up converter 230 can provide as an output signal 235 having a voltage of 5 volts using as an input signal 215 having any of a range of voltages between 1.5 volts and 5 volts. Even wider input voltage ranges are possible.

Analog components 240 are electrically coupled to step-up converter 230 to receive power from higher voltage signal 235. Analog components 240 are integrated chips, discrete electrical components, and circuits capable of providing a substantially infinitely variable output voltage. Analog components 240 include, for example, analog-to-digital converters 240A, process sensors 240B, transmitter temperature sensors 240C, transistors (not shown), and operational amplifiers (not shown). Inclusion of step-up converter 230 to provide signal 235 having the higher voltage enables the use of lower power digital components 220, while increasing the performance of analog components 240.

Figure 4:
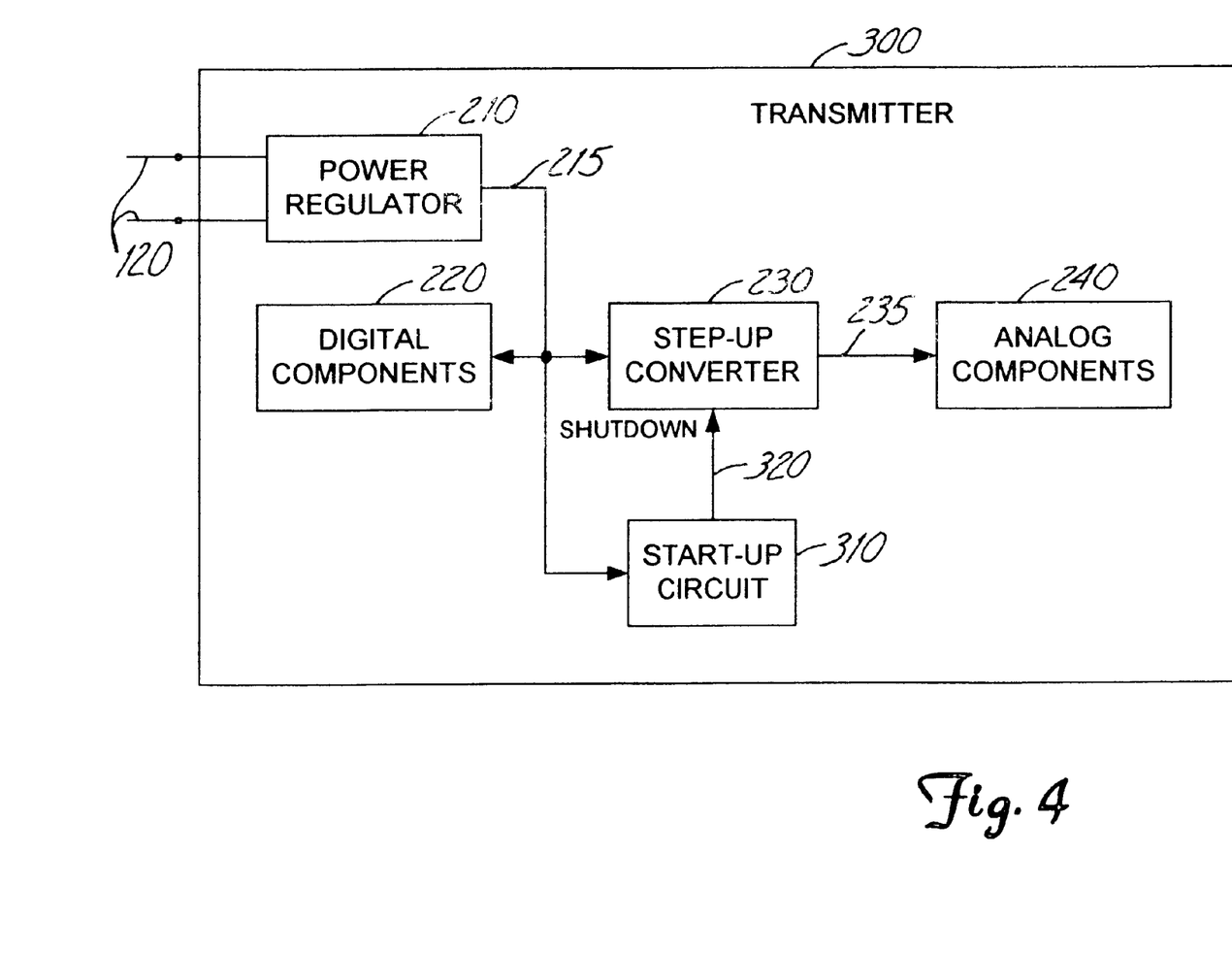
FIG. 4 is a block diagram illustrating circuitry of a process transmitter in accordance with an alternate embodiment of the invention.

FIG. 4 is a block diagram of a third process transmitter 300. Like process transmitter 100, process transmitter 300 includes power regulator 210, digital components 220, step-up converter 230 and analog components 240. Process transmitter 300 also includes start-up circuit 310 electrically coupled to power regulator 210 to receive first signal 215. Start-up circuit 310 is electrically coupled to power regulator 210 by having an input connected, directly or through other electrical components, to the output of power regulator 210 upon which first signal 215 is provided.

Start-up circuit 310 is also electrically coupled to step-up converter 230 to activate the step-up converter after the voltage of signal 215 has surpassed a first threshold voltage. Start-up circuit 310 is electrically coupled to step-up converter 230 by an output of the start-up circuit being electrically connected to an input of the step-up converter. The connection can be direct or through other components such as resistors, capacitors and buffers.

Although in a steady state condition the voltage of first signal 215 is a constant D.C. voltage, upon power-up of transmitter 300, the voltage of first signal 215 will take a period of time to climb or fall to the first voltage. Start-up circuit 310 activates step-up converter 230 by changing a shutdown signal 320 once the voltage of first signal 215 has surpassed a threshold of 2.7 volts, for example. This ensures that step-up converter 230 will not provide second signal 235 until the voltage of signal 215 has reached the predetermined minimum voltage of the first threshold. The predetermined minimum voltage of the first threshold is the minimum input voltage to step-up converter 230 necessary to limit the current draw of the step-up converter to a maximum desired current. The threshold voltage at which start-up circuit 310 activates step-up converter 230 can be any of a wide range of suitable voltages.

Start-up circuit 310 can be implemented using any of a wide variety of circuits and devices. For example, in some embodiments start-up circuit 310 is a power-on-reset (POR) integrated chip. Power-on-reset devices are also frequently referred to as microprocessor supervisory devices. Thus, start-up circuit 310 can be, for example, an integrated circuit power-on-reset chip sold by MAXUM under the part number MAX821.

Figure 5:
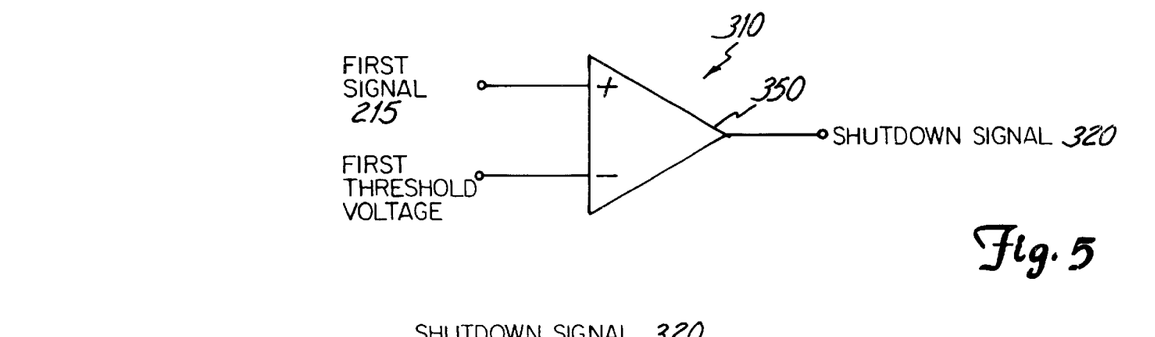
FIG. 5 is a circuit diagram illustrating an implementation of the start-up circuit shown in FIG. 4.

FIG. 5 is a circuit diagram which illustrates another possible implementation of start-up circuit 310. As shown in FIG. 5, start-up circuit 310 can be an operational amplifier 350 used as a comparator and having as first and second inputs first signal 215 and the first threshold voltage. The output of the comparator is shutdown signal 320.

Figure 6:
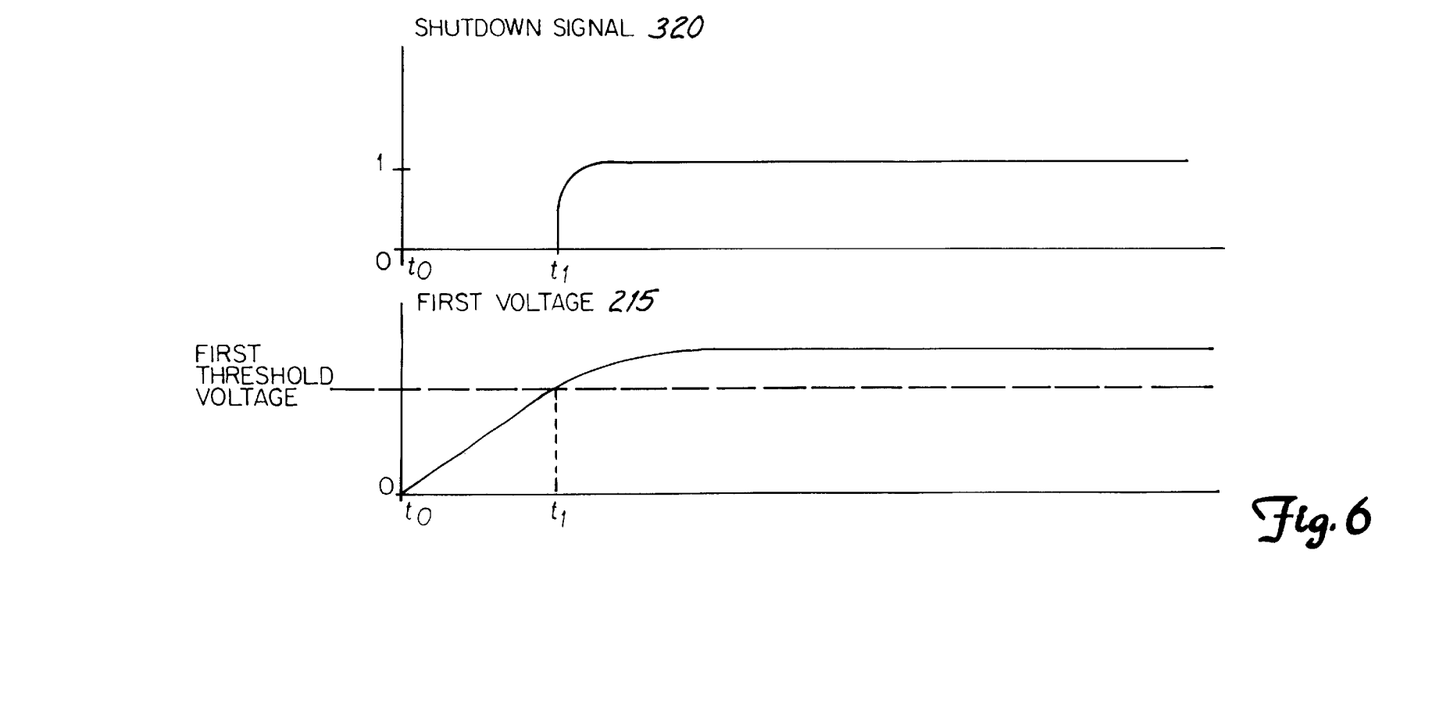
FIG. 6 is a timing diagram illustrating operation of the start-up circuit shown in FIG. 4.

FIG. 6 is a timing diagram illustrating operation of start-up circuit 310. At time $t_0$, the process transmitter is powered up, and first voltage 215 provided by power regulator 210 begins to increase in magnitude. While first voltage 215 increases in magnitude, shutdown signal 320 remains in the "zero" logic level state. At time $t_1$, first voltage 215 surpasses the first threshold voltage, and shutdown signal 320 changes to a "one" logic level state, thus enabling step up converter 230 to generate second signal 235. Of course, the start-up circuit and the step-up converter can be designed such that the step-up converter is enabled by a transition in signal 320 to a logic level "zero" state instead.

Figure 7:
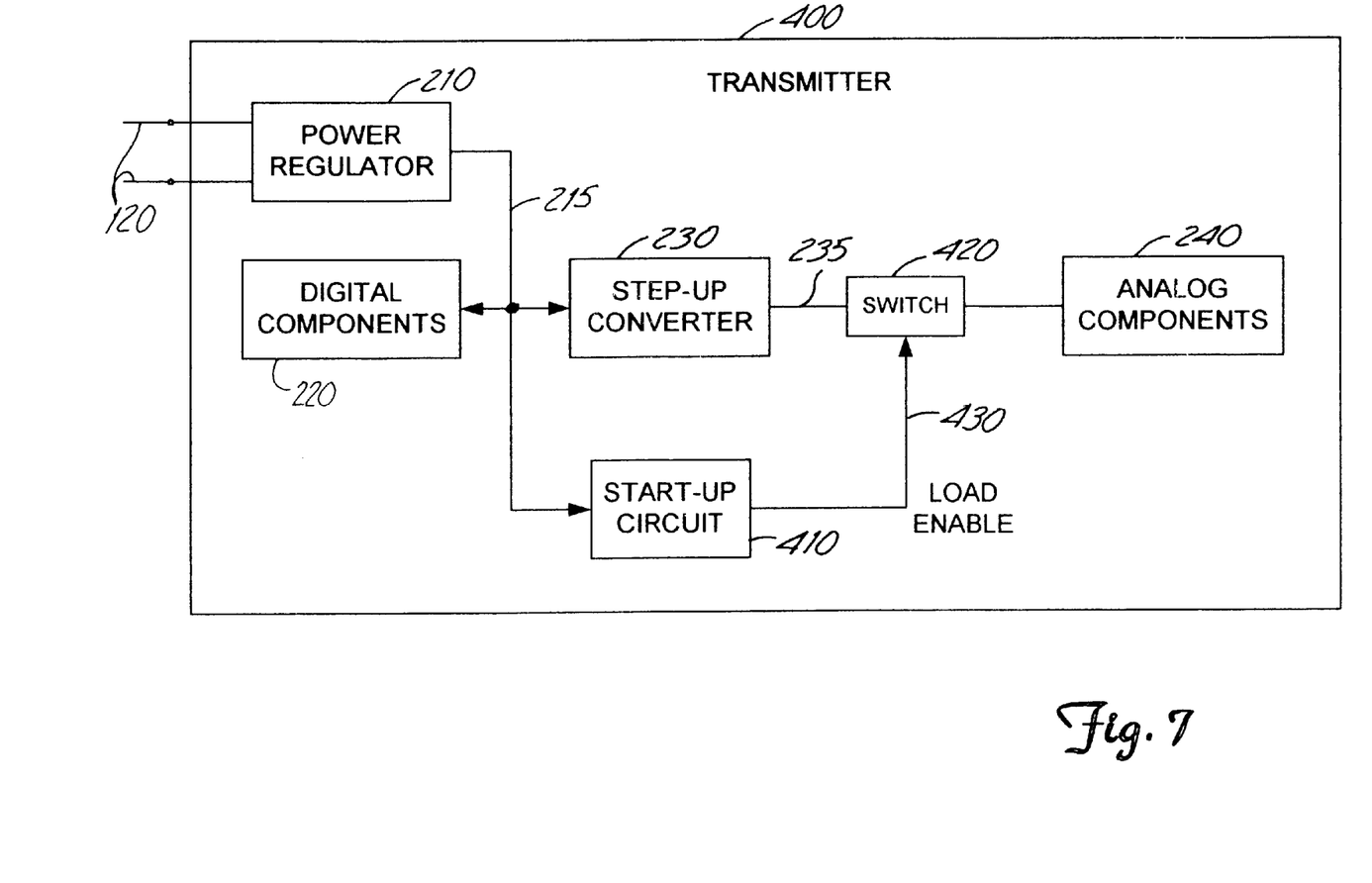
FIG. 7 is a block diagram illustrating circuitry of a process transmitter in accordance with an alternate embodiment of the invention.
Figure 8:
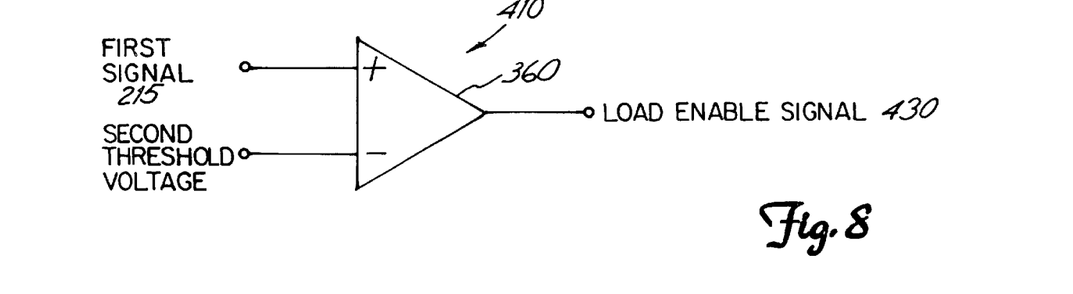
FIG. 8 is a circuit diagram illustrating an implementation of the start-up circuit shown in FIG. 7.
Figure 9:
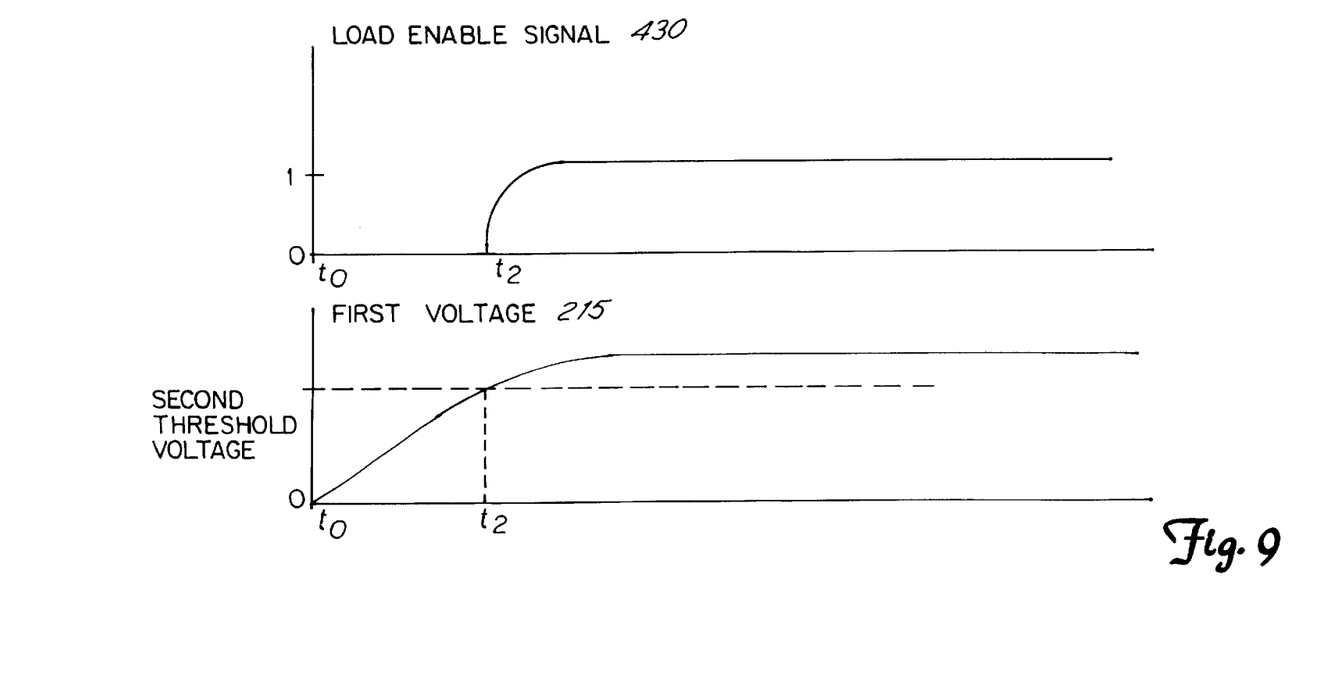
FIG. 9 is a timing diagram illustrating operation of the start-up circuit shown in FIG. 7.
Figure 10:
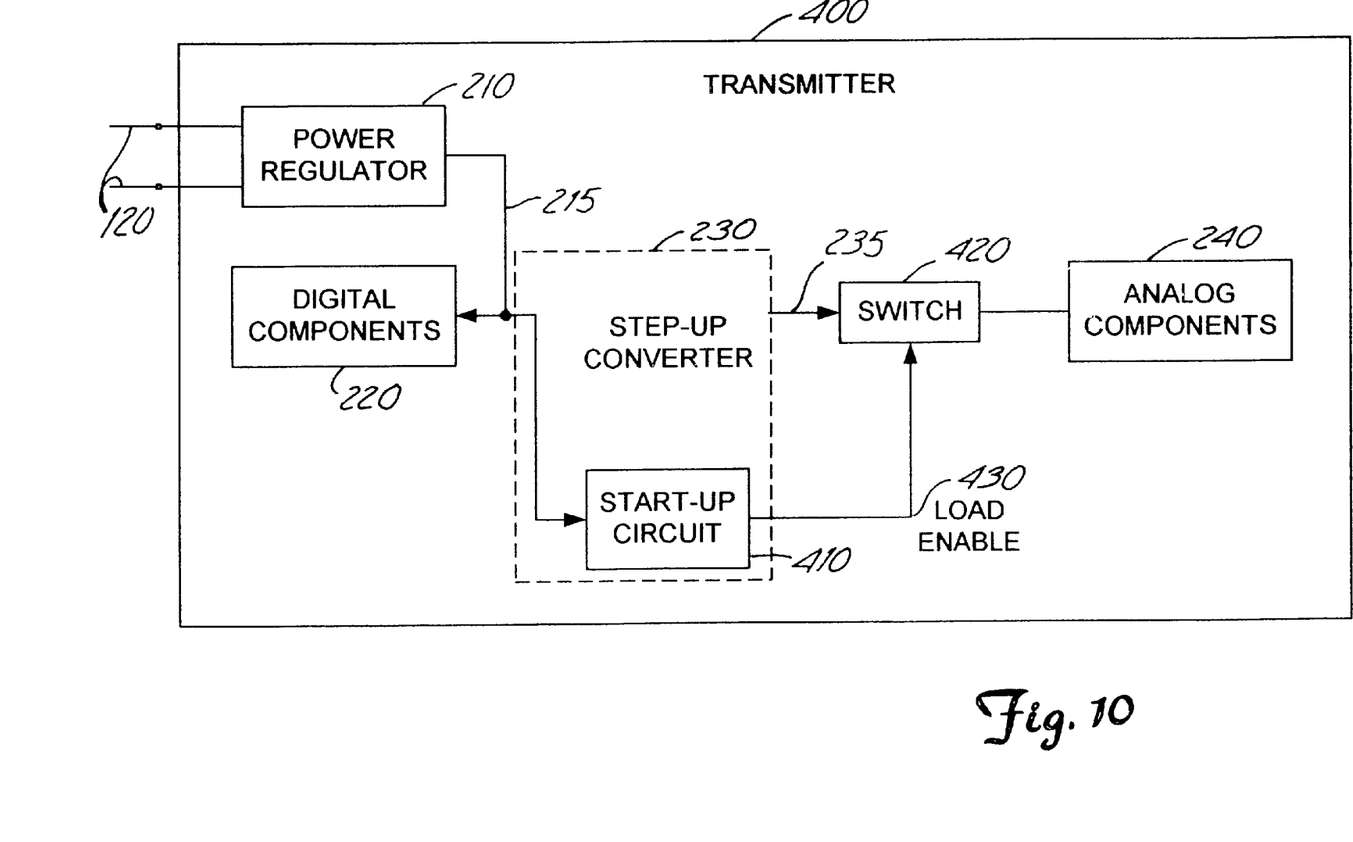
FIG. 10 is a block diagram illustrating an alternate implementation of the process transmitter circuitry shown in FIG. 7.

FIG. 7 is a block diagram of process transmitter 400. FIGS. 8–10 are diagrams illustrating implementation and operation details of transmitter 400 in greater detail. Like process transmitters 100 and 300, process transmitter 400 includes power regulator 210, digital components 220, step-up converter 230 and analog components 240. Process transmitter 400 also includes switch 420 and start-up circuitry 410. When selectively activated, switch 420 electrically couples analog components 240 to step-up converter 230 so that the analog components can receive power from second signal 235. Switch 420 can be any of a wide variety of devices having two terminals, one for coupling to each of second signal 235 and the input to analog components 240. Switch 420 also requires a third input for receiving load enable signal 430 from start-up circuit 410. Switch 420 can be, for example, a solid state switching device, a transistor network, or any of a wide variety of other switch types.

Start-up circuit 410 is electrically coupled to power regulator 210 to receive first signal 215. Start-up circuit 410 is also electrically coupled to switch 420 to activate the switch after the voltage of signal 215 has surpassed a second threshold voltage which is different than the first threshold voltage described with reference to transmitter 300. For example, start-up circuit 410 can activate switch 420 by changing a load enable signal 430 once the voltage of first signal 215 has surpassed a second threshold of 3.0 volts. Prior to the voltage of first signal 215 surpassing the second threshold voltage, switch 420 keeps analog components 240 isolated from step-up converter 230. This allows step-up converter 230 to efficiently reach its full output voltage before a circuit load is connected. The second threshold voltage is selected such that, by connecting analog components 240 to step-up converter 230 only when the voltage of first signal 215 has surpassed the second threshold, proper start-up and high power efficiency operation of the step-up converter is ensured. The threshold voltage at which start-up circuit 410 activates switch 420 can be any of a wide range of voltages.

FIG. 9 is a timing diagram illustrating operation of start-up circuit 410 from time $t_0$ at which the process transmitter is powered up through time $t_2$ at which first voltage 215 surpasses the second threshold voltage. As can be seen in FIG. 9, load enable signal 430 remains in a zero logic level state until first voltage 215 surpasses the second threshold voltage at time $t_2$.

FIG. 8 illustrates one possible circuit implementation of start-up circuit 410. As shown in FIG. 5, start-up circuit 410 can include operational amplifier 360 configured as a comparator comparing first signal 215 to a second threshold voltage. The output of operational amplifier 360 is load enable signal 430. A wide variety of other implementations of start-up circuit 410 can be used as well. For example, as shown in a preferred embodiment illustrated in FIG. 10, start-up circuit 410 can be implemented using a built-in comparator in step-up converter 230. In a preferred embodiment, this portion of the start-up circuit is implemented using a built-in comparator of the MAXUM step-up converter integrated chip, part number MAX756ESA.

Figure 11:
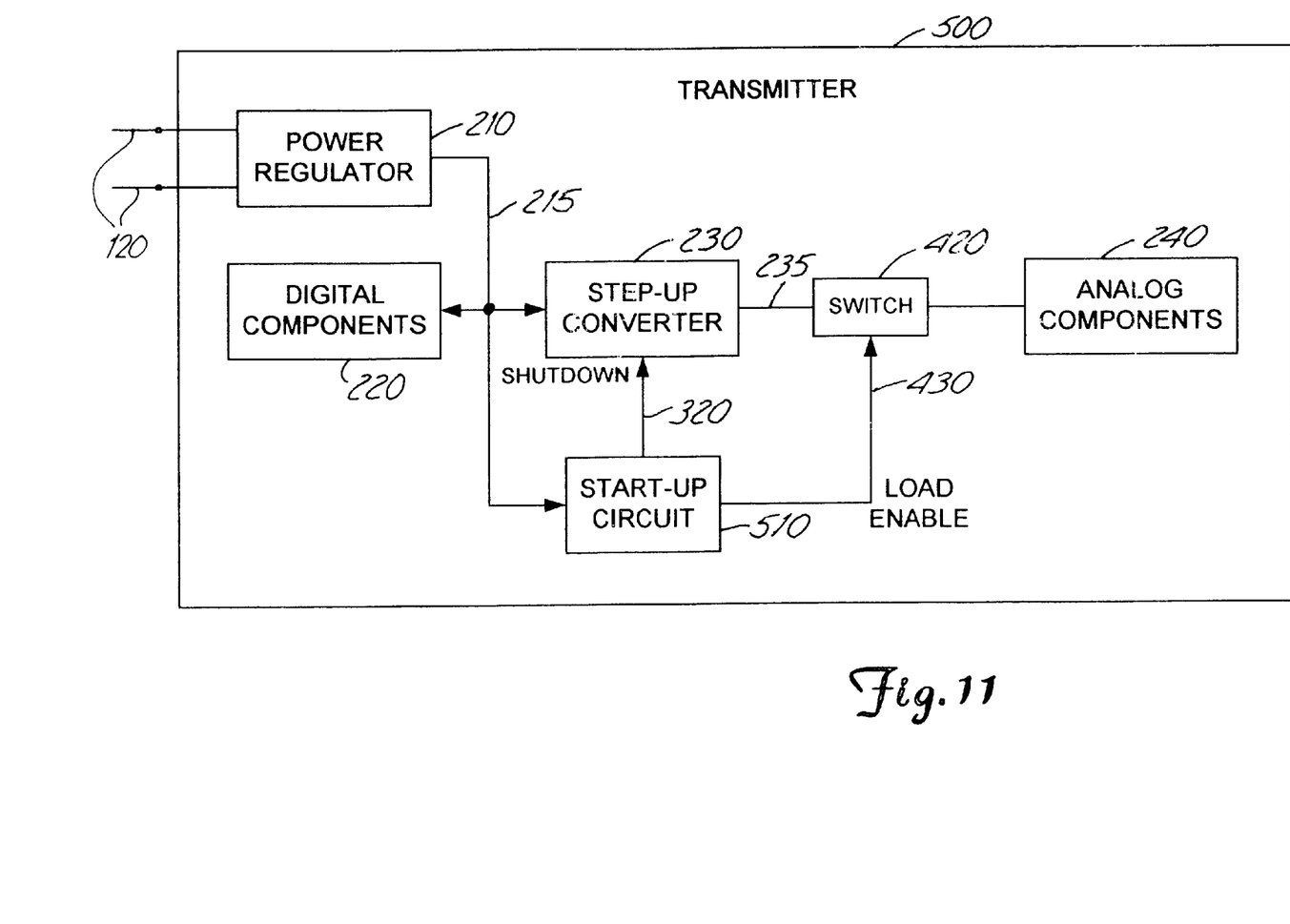
FIG. 11 is a block diagram illustrating circuitry of a process transmitter in accordance with an alternate embodiment of the invention.
Figure 12:
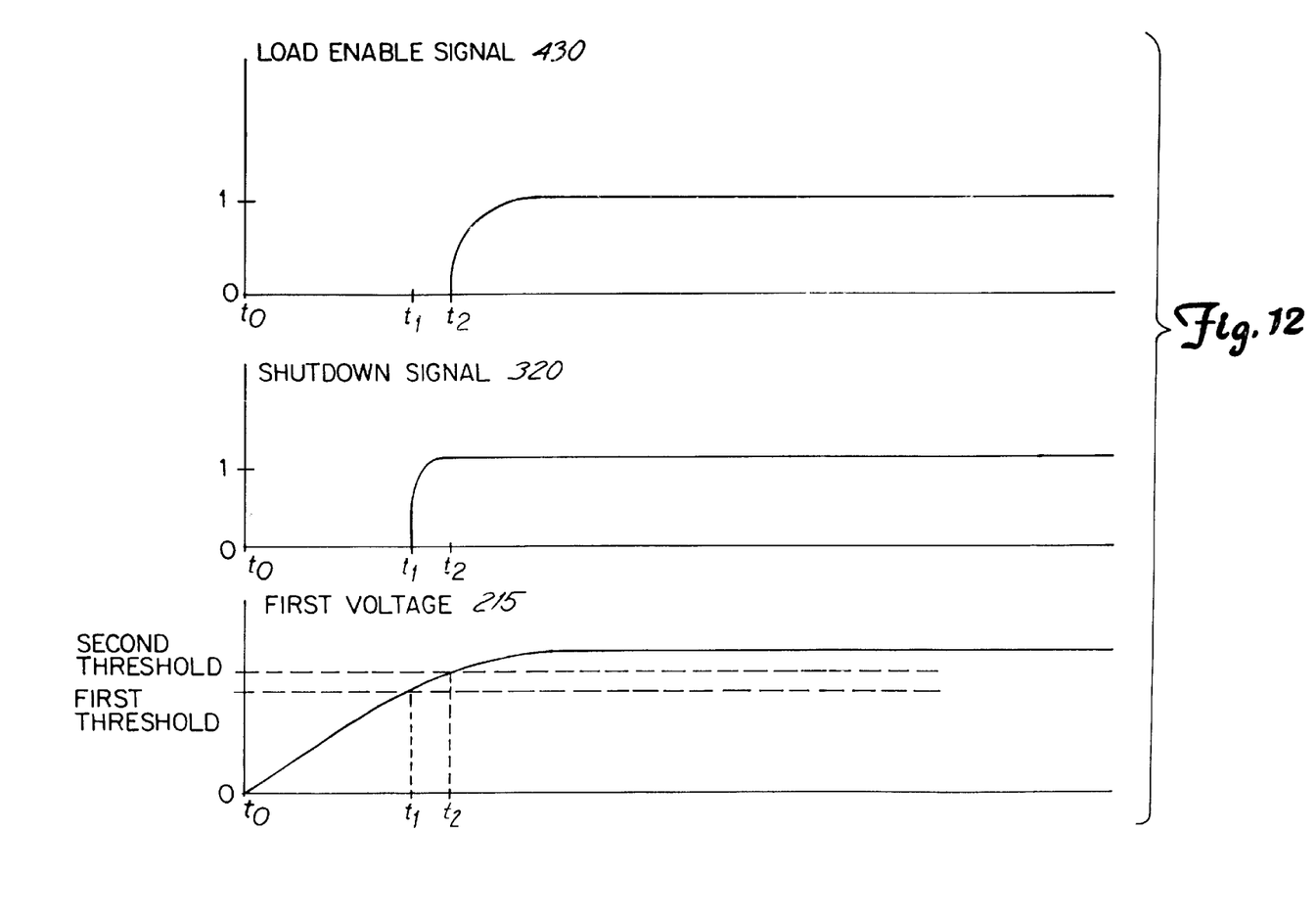
FIG. 12 is a timing diagram illustrating operation of the start-up circuit shown in FIG. 11.

FIG. 11 is a block diagram of process transmitter 500. Process transmitter 500 is similar to process transmitter 400, but includes start-up circuit 510 instead of start-up circuit 410. Start-up circuit 510 implements the functions of both start-up circuit 310 illustrated in FIG. 3, and start-up circuit 410 illustrated in FIGS. 7, 8 and 10. The timing diagram in FIG. 12 illustrates operation of start-up circuit 510. Start-up circuit 510 is electrically coupled to power regulator 210 to receive first signal 215 and is electrically coupled to step-up converter 230 to activate the step-up converter after the voltage of first signal 215 has surpassed a first threshold voltage. Like start-up circuit 310, start-up circuit 510 activates step-up converter 230 by changing shutdown signal 320 once the voltage of first signal 215 has surpassed the first threshold. The first threshold voltage can be, for example, 2.7 volts.

Start-up circuit 510 is also electrically coupled to switch 420 to activate the switch after the voltage of first signal 215 has surpassed a second threshold voltage. Like start-up circuit 410, start-up circuit 510 activates switch 420 by changing load enable signal 430 once the voltage of first signal 215 has surpassed the second threshold, for example 3.0 volts. In the process transmitter, application of the first signal to digital components can occur before, during or after generation of the second signal.

Start-up circuit 510 can be implemented using a wide variety of integrated circuit devices or individual circuits. For example, start-up circuit 510 can be implemented using combination of the comparators illustrated in FIGS. 5 and 8, each comparing the voltage of first signal 215 to a different threshold. As in transmitter 400, the load enable generating portion of start-up circuit 510 can be implemented using a built-in comparator in step-up converter 230. For example, this portion of the start-up circuit can be implemented using a built-in comparator of the MAXUM step-up converter integrated chip part number MAX756ESA. In the alternative, the load enable signal can be generated using a discrete circuit.

What is claimed is:

1. A process transmitter, comprising:
    a power regulator adapted to receive a power signal, the power regulator generating a first signal based on the power signal, the first signal having a first voltage;
    digital components electrically coupled to the power regulator to receive power from the first signal;
    a step-up converter electrically coupled to the power regulator to input the first signal and output a second signal having a second voltage that is larger than the first voltage;
    analog components electrically coupled to the step-up converter to receive power from the second signal; and
    a start-up circuit electrically coupled to the power regulator to receive the first signal and electrically coupled to the step-up converter to activate the step-up converter after the first voltage has surpassed a first threshold voltage.

2. The process transmitter of claim 1, wherein the start-up circuit includes a comparator which compares the first signal to the first threshold voltage and controls a shutdown signal, provided to the step-up converter, as a function of the comparison.

3. The process transmitter of claim 1, wherein the start-up circuit includes a power-on-reset device.

4. A process transmitter, comprising:
    a power regulator adapted to receive a power signal, the power regulator generating a first signal based on the power signal, the first signal having a first voltage;
    digital components electrically coupled to the power regulator to receive power from the first signal;
    a step-up converter electrically coupled to the power regulator to input the first signal and output a second signal having a second voltage that is larger than the first voltage;
    analog components electrically coupled to the step-up converter through a selectively activated switch to receive power from the second signal; and
    a start-up circuit electrically coupled to the power regulator to receive the first signal and electrically coupled to the switch to activate the switch after the first voltage has surpassed a first threshold voltage.

5. The process transmitter of claim 4, wherein the start-up circuit includes a comparator which compares the first signal to the first threshold voltage and controls a load enable signal, provided to the switch, as a function of the comparison.

6. A process transmitter, comprising:
    a power regulator adapted to receive a power signal, the power regulator generating a first signal based on the power signal, the first signal having a first voltage;
    digital components electrically coupled to the power regulator to receive power from the first signal;
    a step-up converter electrically coupled to the power regulator to input the first signal and output a second signal having a second voltage that is larger than the first voltage;
    analog components electrically coupled to the step-up converter through a selectively activated switch to receive power from the second signal; and
    a start-up circuit electrically coupled to the power regulator to receive the first signal and electrically coupled to the step-up converter to activate the step-up converter after the first voltage has surpassed a first threshold voltage, and electrically coupled to the switch to activate the switch after the first voltage has surpassed a second threshold voltage.

7. A process transmitter suitable for coupling to a process loop, the transmitter comprising:
    an electronics module, having:
        a power regulator adapted to receive a power signal on the process loop and to provide a first signal having a first voltage; and
        a first set of digital components electrically coupled to the power regulator to receive power from the first signal; and
    a sensor module electrically coupled to the electronics module, the sensor module having:
        a second set of digital components electrically coupled to the power regulator to receive power from the first signal;
        a step-up converter electrically coupled to the power regulator, wherein the step-up converter receives the first signal and outputs a second signal having a second voltage, and wherein the second voltage is larger than the first voltage; and
        analog components electrically coupled to the step-up converter to receive power from the second signal.

* * * * *

UNITED STATES PATENT AND TRADEMARK OFFICE
CERTIFICATE OF CORRECTION

PATENT NO. : 6,813,318 B1
DATED : November 2, 2004
INVENTOR(S) : Brian L. Westfield et al.

It is certified that error appears in the above-identified patent and that said Letters Patent is hereby corrected as shown below:

<u>Title page,</u>
Item [73], Assignee, please delete "Rosemount Inc," and insert -- Rosemount Inc. --
Item [56], References Cited, U.S. PATENT DOCUMENTS, please delete
"5,360,997  11/1994  Watson  323/268" and insert
-- 5,350,997  09/1994  Ghotbi et al.  323/268 --.
Item [57], ABSTRACT,
Line 1, after "loop" insert -- is disclosed --.

Signed and Sealed this

First Day of March, 2005

JON W. DUDAS
*Director of the United States Patent and Trademark Office*